(12) United States Patent
Nishii et al.

(10) Patent No.: US 9,062,726 B2
(45) Date of Patent: Jun. 23, 2015

(54) DISC BRAKE DEVICE AND CALIPER

(75) Inventors: Kazutoshi Nishii, Susono (JP); Mikio Gomi, Susono (JP); Junichi Tanoue, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 225 days.

(21) Appl. No.: 13/700,841

(22) PCT Filed: Dec. 2, 2011

(86) PCT No.: PCT/JP2011/077967
§ 371 (c)(1),
(2), (4) Date: Nov. 29, 2012

(87) PCT Pub. No.: WO2013/080381
PCT Pub. Date: Jun. 6, 2013

(65) Prior Publication Data
US 2014/0202799 A1      Jul. 24, 2014

(51) Int. Cl.
| F16D 65/14 | (2006.01) |
| F16D 65/00 | (2006.01) |
| F16D 55/227 | (2006.01) |
| F16D 55/00 | (2006.01) |
| F16D 65/02 | (2006.01) |

(52) U.S. Cl.
CPC .......... *F16D 65/0006* (2013.01); *F16D 55/227* (2013.01); *F16D 2055/0016* (2013.01); *F16D 2065/024* (2013.01); *F16D 65/0068* (2013.01)

(58) Field of Classification Search
CPC ............ F16D 55/2255; F16D 65/0068; F16D 65/0075

USPC ............ 188/70 R, 73.1, 73.35, 73.36, 73.39, 188/73.41, 73.42, 73.43, 73.44, 73.45, 188/73.47, 72.2, 72.6
See application file for complete search history.

(56) References Cited

U.S. PATENT DOCUMENTS

| 3,455,417 A | * | 7/1969 | Koji ............................. 188/71.8 |
| 3,721,321 A | * | 3/1973 | Yarber ......................... 188/72.6 |
| 3,935,928 A | * | 2/1976 | Margetts ..................... 188/73.47 |
| 4,301,895 A | * | 11/1981 | Harrison et al. ................ 188/59 |

(Continued)

FOREIGN PATENT DOCUMENTS

| GB | 1 496 225 | * | 12/1977 | ............ F16D 55/224 |
| JP | 08145088 A | * | 6/1996 | ............ F16D 55/224 |
| JP | 2005 220942 | | 8/2005 | |

OTHER PUBLICATIONS

English-Language Abstract of JP 08-145088.*

*Primary Examiner* — Nicholas J Lane
(74) *Attorney, Agent, or Firm* — Oblon, McClelland, Maier & Neustadt, L.L.P.

(57) ABSTRACT

A disc brake device includes a disc rotor, which rotates around a rotation axis, friction pads opposed to friction surfaces of the disc rotor, a first member provided on a fixed part on a vehicle body side, a second member supported so as to be slidable relative to the first member by a slide mechanism, a third member, which holds the friction pads and is supported so as to be swingable relative to the second member around a swing axis in a radial direction of the disc rotor as a center of swing by a swing mechanism, and a return mechanism provided on the swing mechanism to apply force to the third member to restore the same to an initial position in a swing direction. Therefore, the disc brake device has an effect of inhibiting abnormal noise.

9 Claims, 9 Drawing Sheets

(56) References Cited

U.S. PATENT DOCUMENTS

| | | | |
|---|---|---|---|
| 4,344,510 A * | 8/1982 | Johannesen et al. | 188/71.9 |
| 5,431,257 A * | 7/1995 | Rocca et al. | 188/24.21 |
| 2002/0020590 A1 * | 2/2002 | Kuroyanagi et al. | 188/73.44 |

* cited by examiner

DISC BRAKE DEVICE AND CALIPER

FIELD

The present invention relates to a disc brake device and a caliper.

BACKGROUND

Patent Literature 1 discloses a pin slide-type disc brake in which a slide pin is fixed to an ear portion of the caliper by means of a bolt, for example, as conventional disc brake device and caliper. In the pin slide-type disc brake, the slide pin is inserted into a pin hole of a supporting member and the caliper is supported so as to be slidable in a disc axis direction. In the pin slide-type disc brake, a slit is provided on an end face on a slide pin attaching side of the ear portion of the caliper and a head portion having two parallel flat surfaces of the slide pin is arranged in the slit. According to this, the pin slide-type disc brake stops rotation of the slide pin by the opposed flat surfaces of the slit.

CITATION LIST

Patent Literature

Patent Literature 1: Japanese Patent Application Laid-open No. 2005-220942

SUMMARY

Technical Problem

The pin slide-type disc brake disclosed in Patent Literature 1 described above has a room for further improvement in terms of reduction in abnormal noise, for example.

The present invention is achieved in view of the above-described circumstances and an object thereof is to provide the disc brake device and the caliper capable of reducing the abnormal noise.

Solution to Problem

In order to achieve the above mentioned object, a disc brake device according to the present invention includes a disc rotor configured to rotate around a rotation axis; a friction pad opposed to a friction surface of the disc rotor; a first member provided on a fixed part on a vehicle body side; a second member supported so as to be slidable relative to the first member by means of a slide mechanism; a third member configured to hold the friction pad and supported so as to be swingable relative to the second member around a swing axis in a radial direction of the disc rotor as a center of swing by means of a swing mechanism; and a return mechanism provided on the swing mechanism to apply force to the third member to restore the third member to an initial position in a swing direction.

In the disc brake device, it is possible to configure that the return mechanism locates the third member in the initial position in a state in which the friction pad and the friction surface of the disc rotor separate from each other.

In the disc brake device, it is possible to configure that the initial position is a position in which a friction material of the friction pad and the friction surface are parallel to each other in a state in which the friction pad and the friction surface of the disc rotor separate from each other.

In the disc brake device, it is possible to configure that the initial position is a position in which a central position of the second member in a swing direction and a central position of the third member in the swing direction conform to each other.

In the disc brake device, it is possible to configure that the return mechanism includes an elastic member configured to generate force to restore.

In the disc brake device, it is possible to configure that the swing mechanism includes a swing shaft provided on one of the second member and the third member, and the elastic member is interposed between the other of the second member and the third member and the swing shaft.

In order to achieve the above mentioned object, a caliper according to the present invention holds a friction pad opposed to a friction surface of a disc rotor rotating around a rotation axis, and includes a first member provided on a fixed part on a vehicle body side; a second member supported so as to be slidable relative to the first member by means of a slide mechanism; a third member configured to hold the friction pad and supported so as to be swingable relative to the second member around a swing axis in a radial direction of the disc rotor as a center of swing by mean of a swing mechanism; and a return mechanism provided on the swing mechanism to apply force to the third member to restore the third member to an initial position in a swing direction.

Advantageous Effects of Invention

The disc brake device and the caliper according to the present invention have an effect of inhibiting the abnormal noise.

DESCRIPTION OF EMBODIMENTS

An embodiment according to the present invention is hereinafter described in detail with reference to the drawings. Meanwhile, this invention is not limited by the embodiment. Components in the following embodiment include a component easily replaced by one skilled in the art or a substantially identical component.

Embodiment

Figure 1:
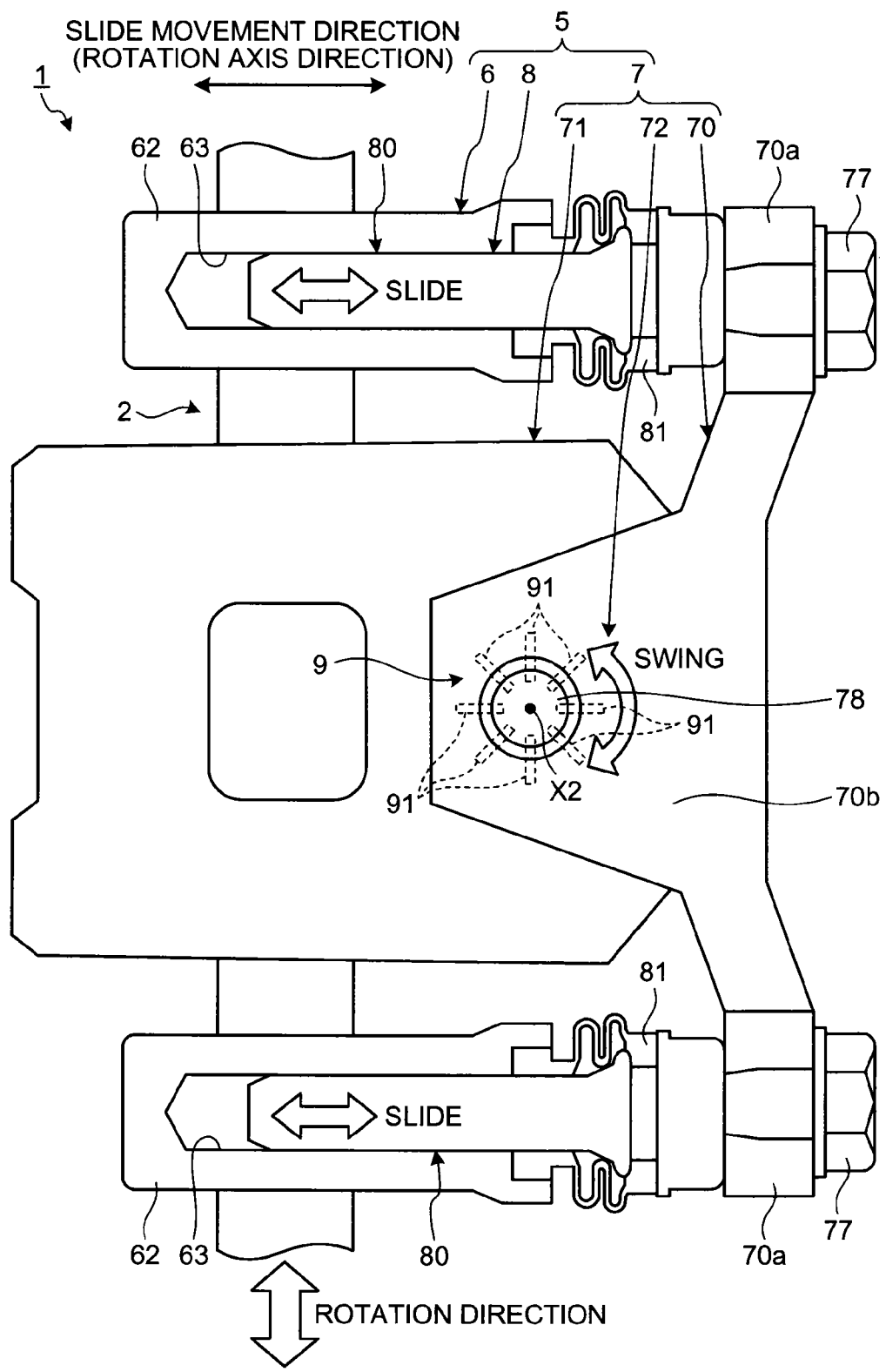
FIG. 1 is a schematic configuration diagram illustrating a disc brake device according to an embodiment.
Figure 2:
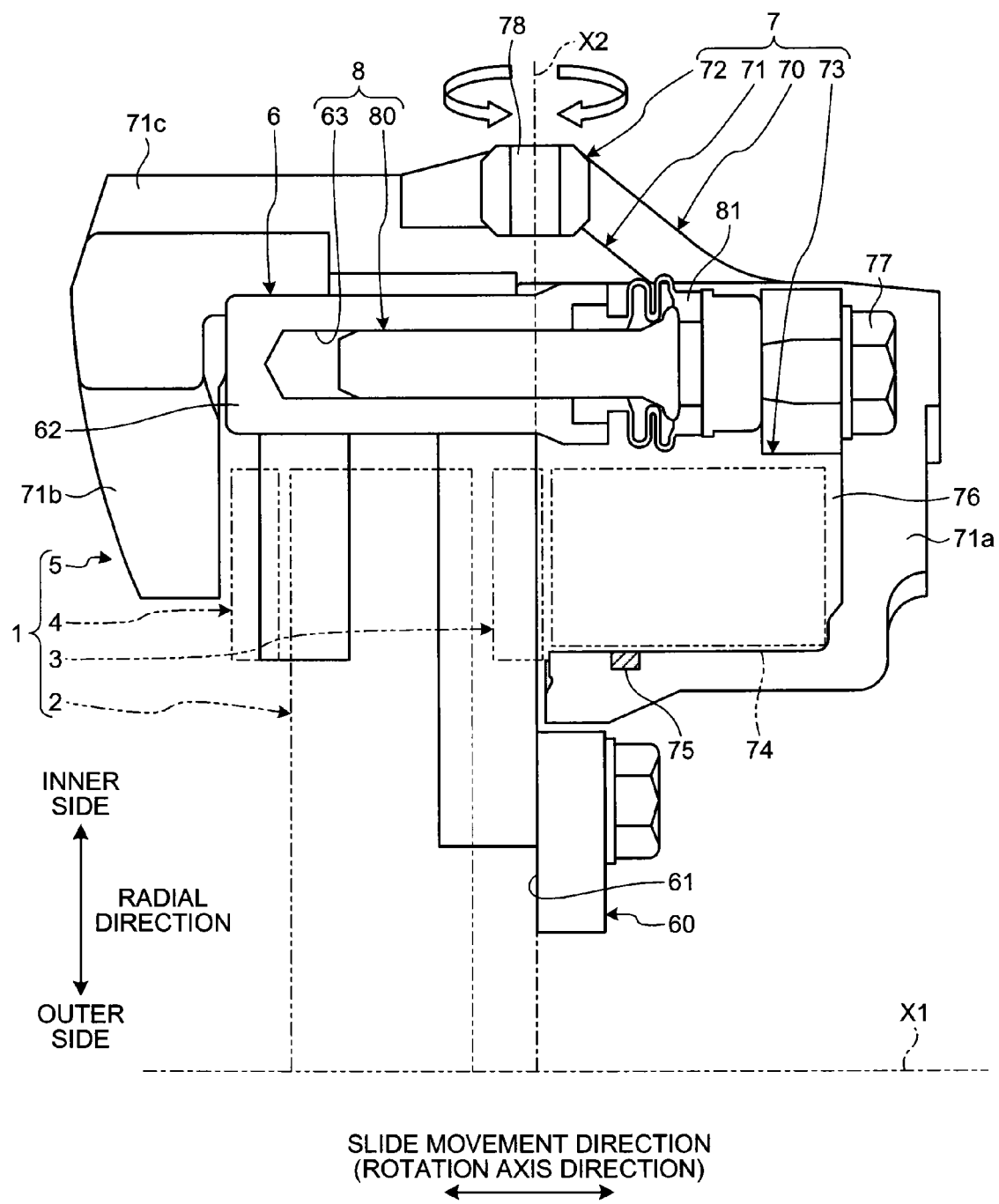
FIG. 2 is a cross-sectional view taken along a swing axis of a caliper of the disc brake device according to the embodiment.
Figure 3:
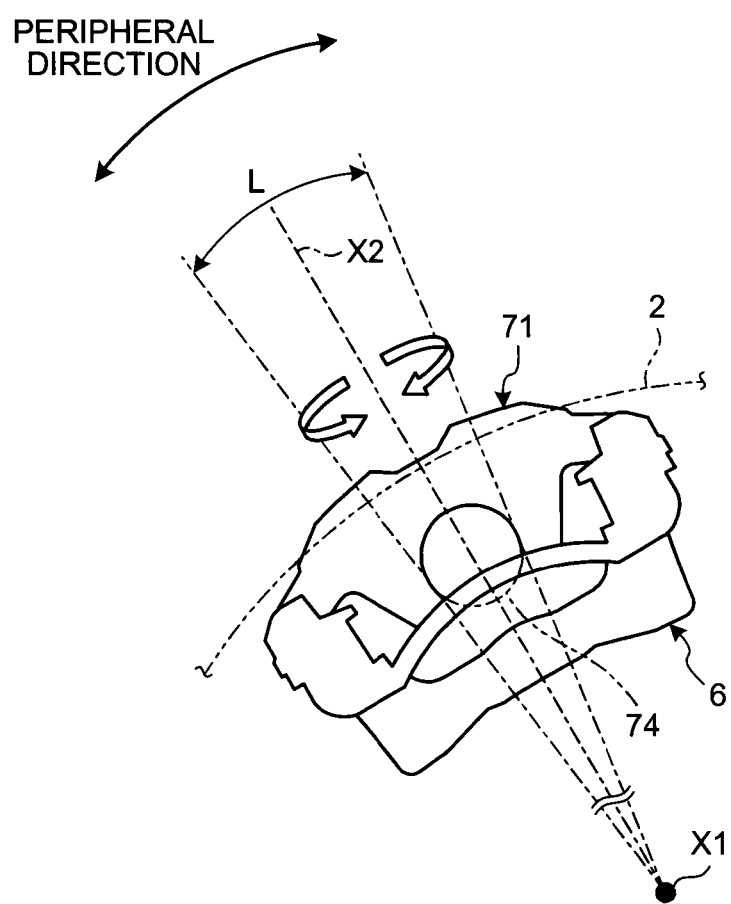
FIG. 3 is a schematic front view of the caliper of the disc brake device according to the embodiment.
Figure 4:
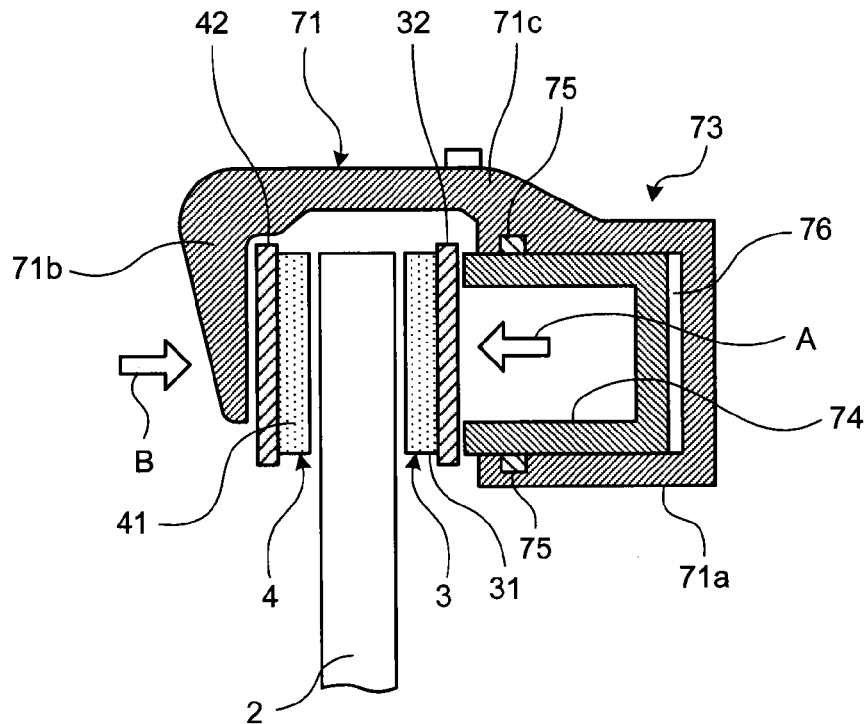
FIG. 4 is a schematic cross-sectional view illustrating operation of the disc brake device according to the embodiment.
Figure 5:
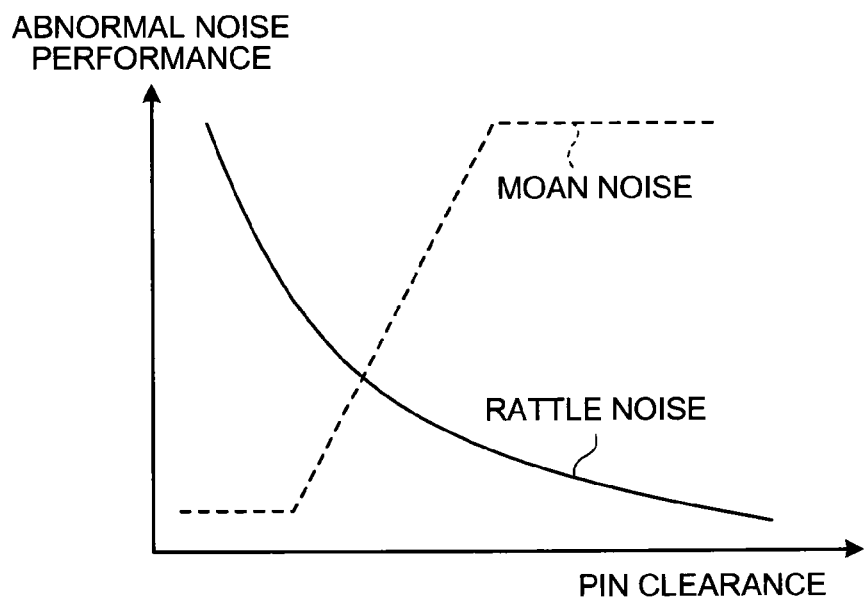
FIG. 5 is a chart explaining an example of a relationship among a pin clearance, rattle noise reduction performance, and moan noise reduction performance.
Figure 6:
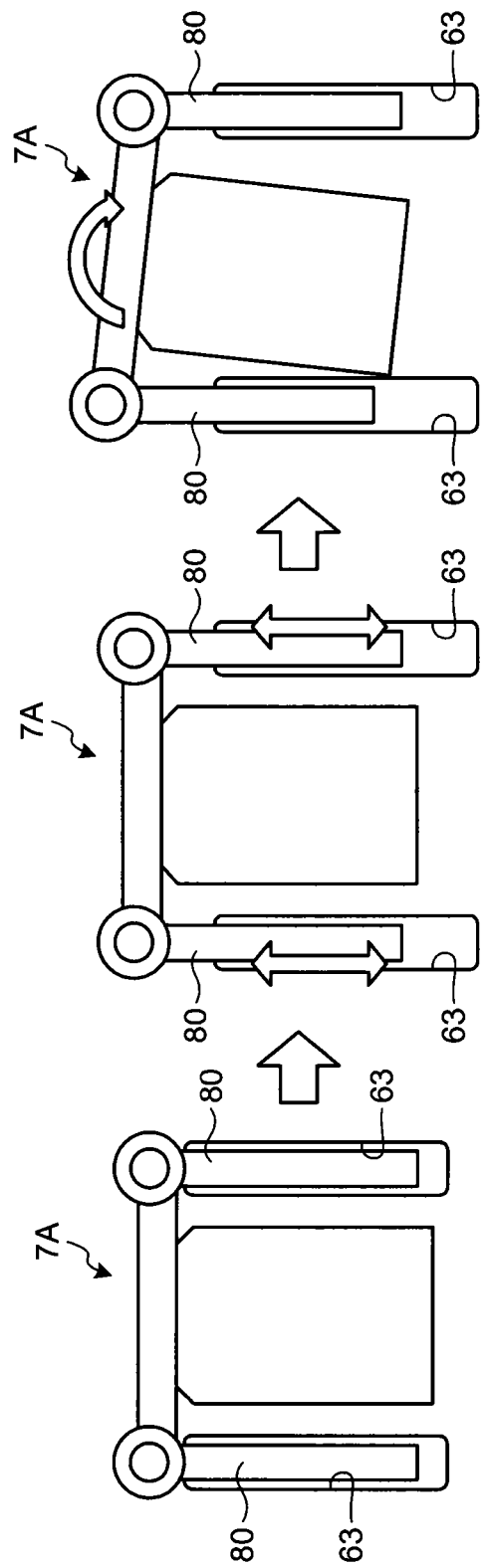
FIG. 6 is a schematic diagram explaining operation of a disc brake device according to a comparative example.
Figure 7:
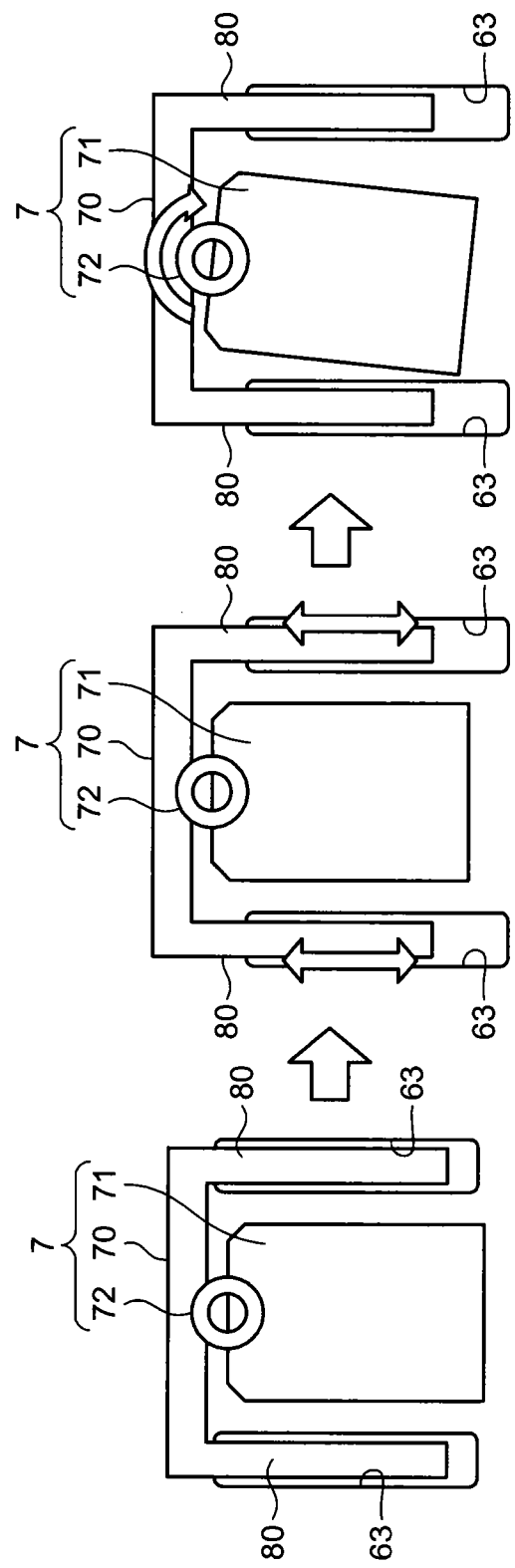
FIG. 7 is a schematic diagram explaining the operation of the disc brake device according to the embodiment.
Figure 8:
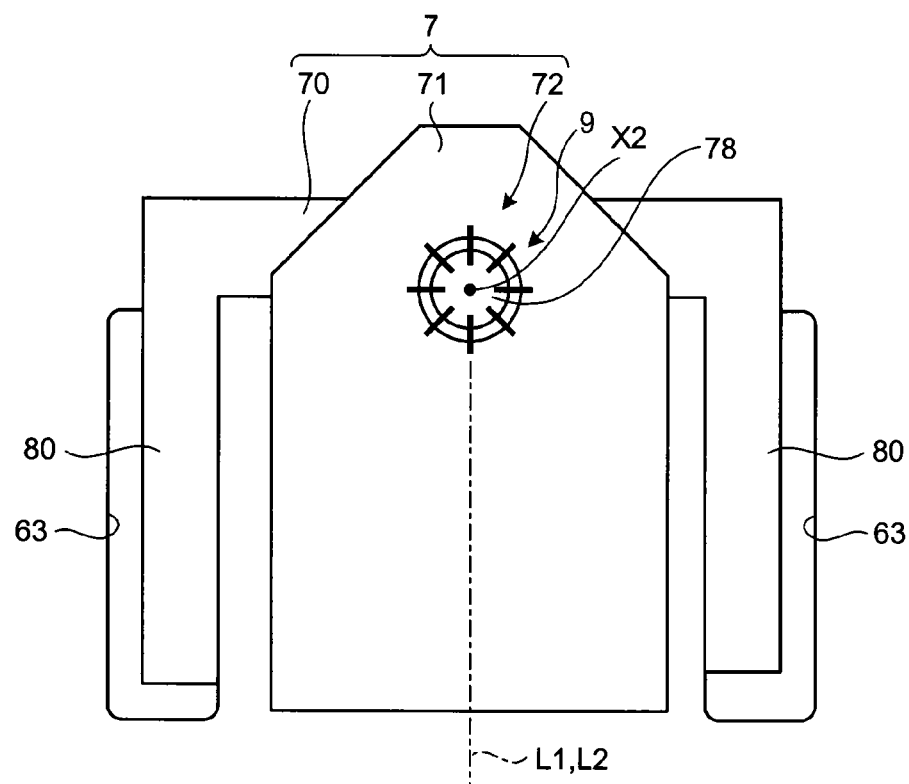
FIG. 8 is a schematic diagram illustrating a return mechanism of the disc brake device according to the embodiment.
Figure 9:
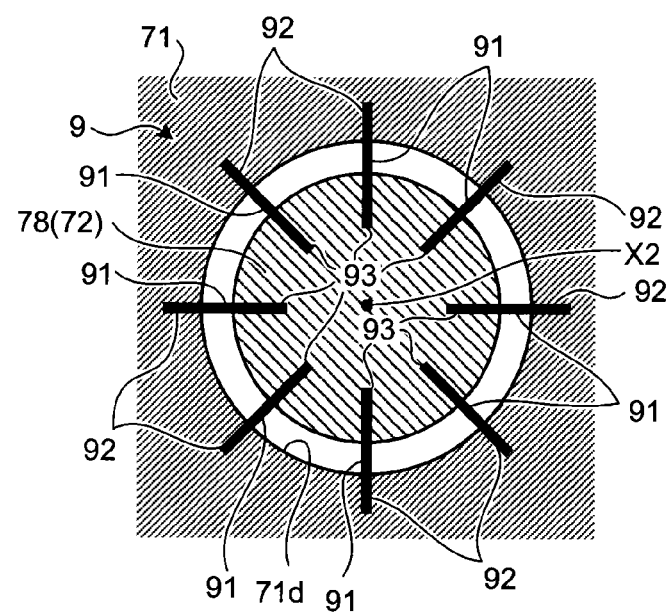
FIG. 9 is a partial cross-sectional view illustrating the return mechanism of the disc brake device according to the embodiment.
Figure 10:
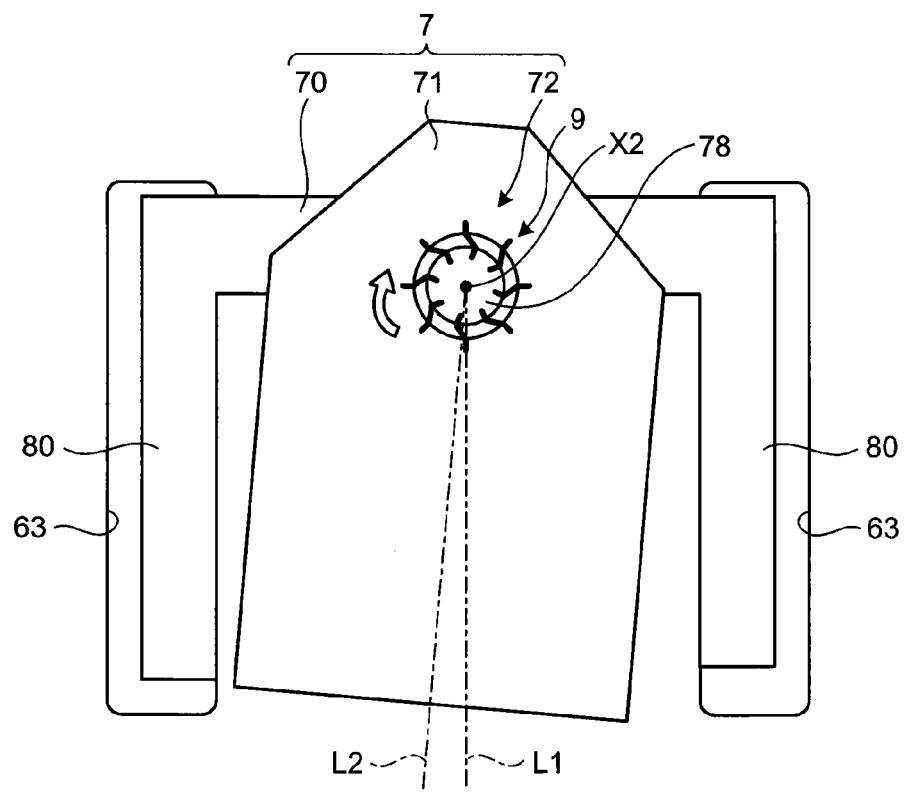
FIG. 10 is a schematic diagram illustrating operation of the return mechanism of the disc brake device according to the embodiment.
Figure 11:
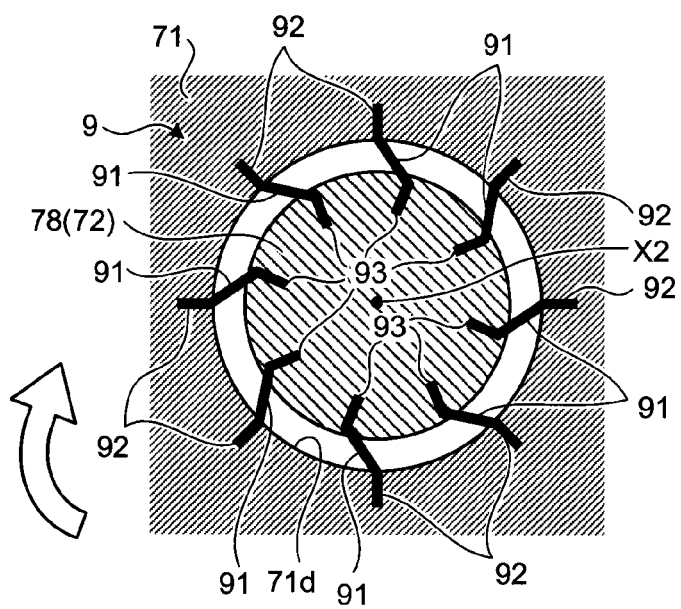
FIG. 11 is a partial cross-sectional view illustrating the operation of the return mechanism of the disc brake device according to the embodiment.
Figure 12:
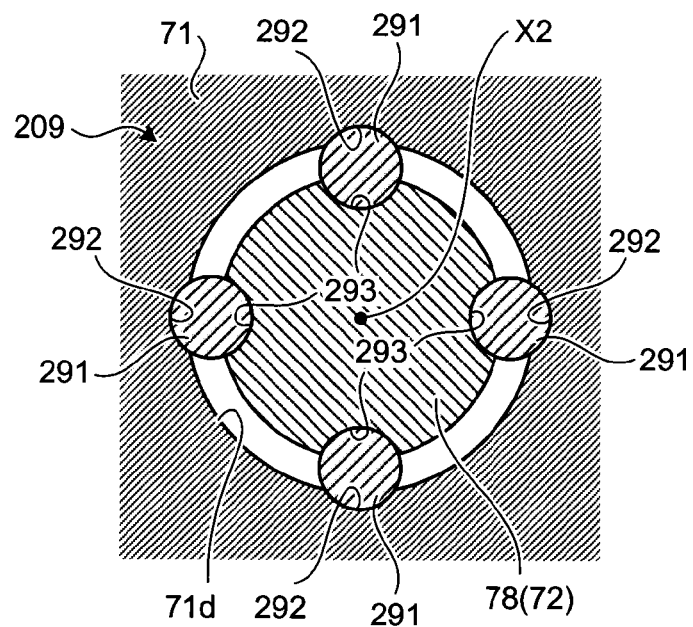
FIG. 12 is a partial cross-sectional view illustrating a return mechanism of the disc brake device according to a modified example.
Figure 13:
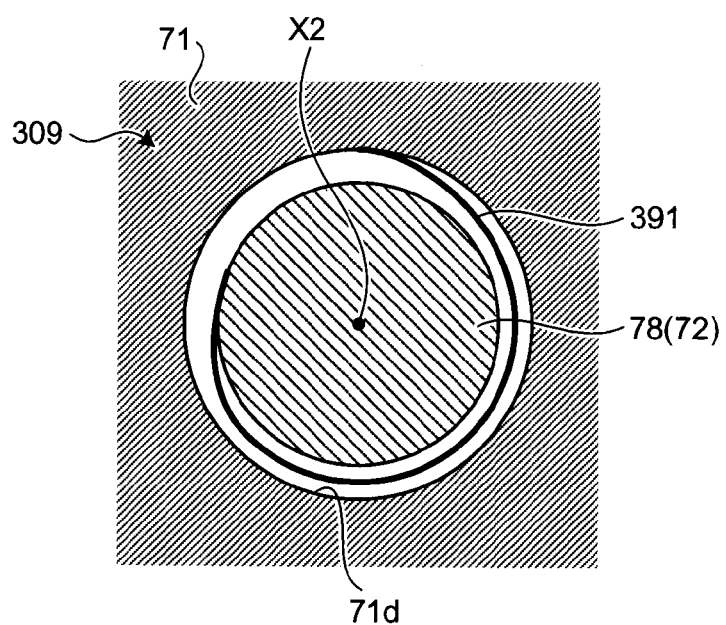
FIG. 13 is a partial cross-sectional view illustrating a return mechanism of the disc brake device according to a modified example.

FIG. 1 is a schematic configuration diagram illustrating a disc brake device according to an embodiment, FIG. 2 is a cross-sectional view taken along a swing axis of a caliper of the disc brake device according to the embodiment, FIG. 3 is a schematic front view of the caliper of the disc brake device according to the embodiment, FIG. 4 is a schematic cross-sectional view illustrating operation of the disc brake device according to the embodiment, FIG. 5 is a chart explaining an example of a relationship among a pin clearance, rattle noise reduction performance, and moan noise reduction performance, FIG. 6 is a schematic diagram explaining operation of a disc brake device according to a comparative example, FIG. 7 is a schematic diagram explaining the operation of the disc brake device according to the embodiment, FIG. 8 is a schematic diagram illustrating a return mechanism of the disc brake device according to the embodiment, FIG. 9 is a partial cross-sectional view illustrating the return mechanism of the disc brake device according to the embodiment, FIG. 10 is a schematic diagram illustrating operation of the return mechanism of the disc brake device according to the embodiment, FIG. 11 is a partial cross-sectional view illustrating the operation of the return mechanism of the disc brake device according to the embodiment, FIG. 12 is a partial cross-sectional view illustrating a return mechanism of the disc brake device according to a modified example, and FIG. 13 is a partial cross-sectional view illustrating a return mechanism of the disc brake device according to a modified example.

A disc brake device 1 of this embodiment illustrated in FIGS. 1 and 2 is mounted on a vehicle for applying braking force to a wheel rotatably supported on a vehicle body of the vehicle. The disc brake device 1 includes a floating caliper 5 and generates the braking force by pressing friction pads 3 and 4 against a disc rotor 2 by a cylinder 7 supported on a mounting 6. In this floating caliper disc brake device 1, the cylinder 7 is supported so as to be slidingly movable relative to the mounting 6 in a direction along a rotation axis X1 of the wheel (hereinafter, sometimes referred to as "rotation axis direction").

In the disc brake device 1 of this embodiment, the cylinder 7 has a divided structure. In the disc brake device 1, divided members are swingably connected to each other in a predetermined positional relationship. According to this, the disc brake device 1 inhibits abnormal noise generated during running, braking and the like, for example.

Specifically, the disc brake device 1 is provided with the disc rotor 2, a pair of friction pads 3 and 4, and the caliper 5. The caliper 5 is provided with the mounting 6 as a first member, the cylinder 7, and a slide mechanism 8. The cylinder 7 is provided with a first cylinder member 70 as a second member, a second cylinder member 71 as a third member, and a swing mechanism 72.

The disc rotor 2 is formed to have a substantially circular disc shape. The disc rotor 2 is provided on a wheel side so as to be rotatable around the rotation axis X1 of an axle integrally with the wheel. That is to say, the disc rotor 2 rotates around the rotation axis X1 as a center of rotation.

The friction pads 3 and 4 are a pair of friction members provided so as to be opposed to friction surfaces on both sides of the disc rotor 2.

The caliper 5 holds the friction pads 3 and 4 such that they are opposed to the friction surfaces of the disc rotor 2. The caliper 5 includes the mounting 6, the cylinder 7, the slide mechanism 8 and the like as described above. In the caliper 5, the cylinder 7 holds the friction pads 3 and 4. In the caliper 5, the cylinder 7 is supported so as to be slidable relative to the mounting 6 by means of the slide mechanism 8. According to this, the caliper 5 can press the friction pads 3 and 4 against the friction surfaces of the disc rotor 2.

More specifically, the mounting 6 is provided on a suspension 60 as a fixed part on a vehicle body side. On the mounting 6, the cylinder 7 is provided so as to be slide-transferring movable, in other words, so as to be slidingly movable. The mounting 6 is fixed on the vehicle body side by means of the suspension 60, an intermediate beam and the like. The mounting 6 is fastened (fixed) to an attachment surface 61 of the suspension 60 by means of a bolt and the like. Herein, the attachment surface 61 is a flat surface substantially orthogonal to the rotation axis X1.

The mounting 6 includes a pair of sleeves 62 on both of front and rear sides in a rotation direction of the disc rotor 2. In the mounting 6, a fitting hole 63 as a concave portion, one end of which is opened and the other end of which is closed, is formed on each sleeve 62. Each fitting hole 63 is formed so as to be elongated in the rotation axis direction of the disc rotor 2.

The cylinder 7 is capable of bringing the friction pads 3 and 4 closer to the disc rotor 2 to press them against the friction surfaces by slidingly moving in association with braking operation of a driver in a state of holding the friction pads 3 and 4. The cylinder 7 includes the first cylinder member 70, the second cylinder member 71, the swing mechanism 72 and the like as described above and further includes a pressing actuator 73. In the cylinder 7, the first cylinder member 70 and the second cylinder member 71 are separately formed and they are connected to each other so as to be swingable by means of the swing mechanism 72.

The first cylinder member 70 is supported so as to be slidable relative to the mounting 6 by means of the slide mechanism 8. The first cylinder member 70 is provided with a pair of arm portions 70a on both of the front and rear sides in the rotation direction of the disc rotor 2. In the first cylinder member 70, a central portion interposed between the pair of arm portions 70a serves as a projection 70b. In the first cylinder member 70, a pair of arm portions 70a and the projection 70b are integrally formed.

Herein, a pair of slide mechanisms 8 are provided corresponding to a pair of sleeves 62. Each slide mechanism 8 is a so-called pin slide-type mechanism including the above-described fitting hole 63 and a slide pin 80. In each slide mechanism 8, each slide pin 80 is inserted into each fitting hole 63. Each slide mechanism 8 supports the first cylinder member 70 on the mounting 6 such that they may slidingly move by means of the slide pin 80 inserted into the fitting hole 63. In each slide mechanism 8, the rotation axis direction of the disc rotor 2 corresponds to a direction of slide movement of the first cylinder member 70 (by extension, an entire cylinder 7).

The fitting hole 63 is provided on one of the mounting 6 and the first cylinder member 70, herein on the mounting 6 as described above. A total of two fitting holes 63, one for each sleeve 62 of the mounting 6, are provided as described above.

The slide pin 80 is provided on the other of the mounting 6 and the first cylinder member 70, herein on the first cylinder member 70. The slide movement of the slide pin 80 is guided by the fitting hole 63. The slide pin 80 is formed to have a cylindrical shape. A length of the slide pin 80 in the direction of slide movement is set in consideration of wear allowance and the like of the friction pads 3 and 4, for example. A total of two slide pins 80, one for each arm portion 70a of the first cylinder member 70, are provided. A base end of each slide pin 80 is fixed to a corresponding arm portion 70a by means of a fixing bolt 77. A tip end of each slide pin 80 is movably inserted (fitted) into each fitting hole 63.

Therefore, the first cylinder member 70 (by extension, the entire cylinder 7) is movable relative to the mounting 6 in the rotation axis direction of the disc rotor 2, that is to say, in a direction orthogonal to the rotation direction by the slide mechanism 8. Herein, a clearance between the fitting hole 63 and the slide pin 80 is set to be as small as possible within a range in which the slide movement of the slide pin 80 is allowed.

Meanwhile, in each slide mechanism 8, a pin boot 81 is attached between each arm portion 70a and each sleeve 62. The pin boot 81 covers a fitting clearance between the end of the slide pin 80 and the fitting hole 63. According to this, each slide mechanism 8 may prevent a foreign material from entering the fitting hole 63 by the pin boot 81.

The second cylinder member 71 holds the friction pads 3 and 4 and is supported so as to be swingable relative to the first cylinder member 70 around a swing axis X2 in a radial direction of the disc rotor 2 as a center of swing by means of the swing mechanism 72. The second cylinder member 71 has a U shape to straddle over the disc rotor 2 (also refer to FIG. 4). The pressing actuator 73 is mounted on the second cylinder member 71. The pressing actuator 73 is composed of an actuator capable of moving a piston 74 as a pressing member in a front-read direction.

More specifically, the second cylinder member 71 includes a cylinder unit 71a, a reaction unit 71b, and a connection 71c (also refer to FIG. 4). The cylinder unit 71a is provided with the pressing actuator 73. The reaction unit 71b is arranged in a position opposed to the cylinder unit 71a across the disc rotor 2. The connection 71c connects the cylinder unit 71a to the reaction unit 71b. In the second cylinder member 71, the cylinder unit 71a, the reaction unit 71b, and the connection 71c are integrally formed.

Out of the above-described pair of friction pads 3 and 4, the friction pad 3 is arranged on a side of the cylinder unit 71a of the second cylinder member 71 to serve as an inner pad and the friction pad 4 is arranged on a side of the reaction unit 71b to serve as an outer pad. The friction pads 3 and 4 are configured such that base ends of friction materials 31 and 41 (refer to FIG. 4) are fixed to back metals 32 and 42 (refer to FIG. 4). In the friction pad 3, front and rear ends of the back metal 32 are supported by a pair of guide members and the like. In the friction pad 3, a base end surface of the back metal 32 is brought into contact with a front surface of the piston 74 of the pressing actuator 73 mounted on the cylinder unit 71a. On the other hand, in the friction pad 4, the back metal 42 is fixedly or movably supported on the reaction unit 71b.

The swing mechanism 72 supports the second cylinder member 71 on the first cylinder member 70 such that they may swing around the swing axis X2 in the radial direction of the disc rotor 2 as the center of swing. The swing mechanism 72 includes a swing shaft 78. The swing shaft 78 is formed to have a cylindrical shape and a central axis of the cylinder serves as the swing axis X2. The swing mechanism 72 supports the second cylinder member 71 on the first cylinder member 70 such that they may swing relative to each other by means of the swing shaft 78. In other words, the swing mechanism 72 connects the first cylinder member 70 and the second cylinder member 71 such that they may swing relative to each other by the swing shaft 78.

The swing axis X2 is a central axis of rotation/swing of the second cylinder member 71 relative to the first cylinder member 70 during braking. The swing axis X2 is set to be parallel to the radial direction of the disc rotor 2. Herein, the radial direction of the disc rotor 2 is a direction along a plane orthogonal to the rotation axis X1. The swing axis X2 of this embodiment is parallel to the attachment surface 61 of the suspension 60 and the mounting 6 and is herein located substantially on the attachment surface 61. In more detail, the swing axis X2 passes through the rotation axis X1 of the disc rotor 2 to be orthogonal to the rotation axis X1 as illustrated in FIG. 3. The swing axis X2 passes through a range L in which the piston 74 presses the friction pad 3 (hereinafter, sometimes referred to as "pressing range") in a direction around the rotation axis X1 of the disc rotor 2 (hereinafter, sometimes referred to as "rotation axis peripheral direction"). The pressing range L corresponds to an angular range of a region pressed by the piston 74 (region on an abutment surface of the piston 74) on the basis of a point on the rotation axis X1 in the rotation axis peripheral direction. That is to say, the swing axis X2 is set in a position passing through the rotation axis X1 and is overlapped with the piston 74 as seen from a side of the vehicle. More preferably, the swing axis X2 is set in a position parallel to the radial direction of the disc rotor 2 and passing through a central position of the region pressed by the piston 74 (center of a pressing load) and the rotation axis X1. The swing axis X2 preferably passes through the center of the pressing load of the piston 74 or that of all of a plurality of abutment surfaces when there are a plurality of abutment surfaces of the piston 74, for example. In the swing mechanism 72, the swing shaft 78 is formed such that the swing axis X2 is in the above-described positional relationship. According to this, the swing mechanism 72 may appropriately set the swing axis X2 in a position on the center of rotation of the second cylinder member 71 when the friction pads 3 and 4 are brought into contact with the friction surfaces of the disc rotor 2.

Meanwhile, the swing shaft 78 is provided on one of the first cylinder member 70 and the second cylinder member 71. Herein, the swing shaft 78 is provided on the first cylinder member 70 and inserted into a shaft hole 71d (refer to FIG. 9) formed on the second cylinder member 71, thereby supporting the second cylinder member 71 on the first cylinder member 70 such that they may swing relative to each other.

In the pressing actuator 73, the piston 74 is movably supported on the cylinder unit 71a as illustrated in FIGS. 2 and 4. In the pressing actuator 73, a seal mechanism 75 capable of sealing to an outer surface of the piston 74 is attached to an inner surface of the cylinder unit 71a. The piston 74 is a pressing member to press the friction pad 3 against the friction surface of the disc rotor 2. In the pressing actuator 73, a hydraulic pressure chamber (a so-called wheel cylinder) 76 as a pressing pressure chamber is sectioned by the cylinder unit 71a, the piston 74, and the seal mechanism 75. In the pressing actuator 73, a tip end of the piston 74 is opposed to the back metal 32 of the friction pad 3. The hydraulic pressure chamber 76 is supplied with working oil as a working medium to generate force to press the friction pads 3 and 4 against the friction surfaces of the disc rotor 2.

In the disc brake device 1 configured in the above-described manner, the hydraulic pressure chamber 76 of the pressing actuator 73 is supplied with the working oil to be pressurized according to depression operation of a brake pedal by the driver, brake control such as so-called ABS control and the like, for example. Then, in the disc brake device 1, the piston 74 moves forward in a direction indicated by an arrow A in FIG. 4 and the front surface of the piston 74 presses the back metal 32 of the friction pad (inner pad) 3. According to this, the disc brake device 1 may bring a front surface of the friction pad 3 closer to the friction surface of the disc rotor 2. At that time, in the cylinder 7, the first cylinder member 70, the second cylinder member 71, the swing mechanism 72 and the like may integrally move forward in a direction opposite to that of the piston 74, that is to say, in a direction indicated by an arrow B in FIG. 4 by movement reaction force of forward movement of the piston 74, thereby bringing a pressing surface of the friction pad (outer pad) 4 closer to the friction surface of the disc rotor 2.

In the disc brake device 1, the friction pads 3 and 4 are pressed against the friction surfaces of the disc rotor 2 by the pressing force generated by supply of the working oil to the hydraulic pressure chamber 76 to sandwich the disc rotor 2. According to this, in the disc brake device 1, friction resistance force is generated between the friction pads 3 and 4 and the disc rotor 2 rotating together with the wheel, and predetermined rotation resistance force acts on the disc rotor 2. As a result, the disc brake device 1 can apply the braking force to the disc rotor 2 and the wheel rotating integrally with the same. In the disc brake device 1, the piston 74 and the cylinder 7 retract to be returned to predetermined positions and the friction pads 3 and 4 separate from the disc rotor 2 when the hydraulic pressure chamber 76 is depressurized.

In the meantime, in the disc brake device 1, each slide pin 80 of the slide mechanism 8 slidingly moves in the rotation axis direction of the disc rotor 2 in a state of being fitted into each fitting hole 63, and according to this, the entire cylinder 7 slidingly moves relative to the mounting 6 as described above. According to this, in the disc brake device 1, the entire cylinder 7 and the piston 74 relatively move in opposite directions as described above while being guided by the slide mechanism 8. The cylinder 7 can move to a braking state position in which the friction pads 3 and 4 are pressed against the friction surfaces of the disc rotor 2 and to a non-braking state position in which the friction pads 3 and 4 separate from the friction surfaces by each slide mechanism 8.

In the disc brake device 1 of this embodiment, the mounting 6 and the first cylinder member 70 are slidably connected to each other by means of the slide mechanism 8 and the first cylinder member 70 and the second cylinder member 71 are swingably connected to each other by means of the swing mechanism 72. According to this, the disc brake device 1 can reduce so-called rattle noise as well as so-called moan noise. Therefore, the disc brake device 1 can satisfy both of reduction in moan noise and reduction in rattle noise, thereby appropriately reducing the abnormal noise. As a result, the disc brake device 1 may inhibit various types of abnormal noise generated during running, braking and the like, for example.

Herein, the rattle noise is a rattle generated while the vehicle runs. The rattle noise might be generated when the cylinder 7 moves by vertical G force and the like input from a road surface when the vehicle runs on a rough road surface, for example, and accordingly the slide pin 80 collides with an inner wall surface of the fitting hole 63 in a state in which the disc brake device 1 does not generate the braking force.

On the other hand, the slide mechanism 8 of this embodiment can surely restrain the slide pin 80 in the fitting hole 63 by making the clearance between the fitting hole 63 and the slide pin 80 as small as possible within a range in which the slide movement of the slide pin 80 is possible. According to this, the slide mechanism 8 can decrease a collision speed of the slide pin 80 in the fitting hole 63 to decrease collision energy, so that this can reduce the rattle noise. Meanwhile, in this case, in the slide mechanism 8, tolerance between an inner diameter of the fitting hole 63 and an outer diameter of the slide pin 80 may be set to be within a tolerance zone of loose fit.

Also, in this case, the slide mechanism 8 may surely restrain the slide pin 80 in the fitting hole 63, so that this may sufficiently secure stability of the cylinder 7 relative to the disc rotor 2. According to this, the slide mechanism 8 may surely hold the cylinder 7 in an appropriate position in the non-braking state, so that this can surely inhibit drag and the like of the friction pads 3 and 4.

On the other hand, the moan noise is self-excited vibration noise (squeal) at approximately hundreds of Hz generated during braking of the vehicle. This moan noise might be generated when the intermediate beam, the suspension 60 and the like form a coupled vibration system (vibration transmitting system) through the cylinder 7, the slide pin 80, the mounting 6 and the like to generate self-excitation vibration with contact sites between the friction pads 3 and 4 and the disc rotor 2 as a vibration source, for example, in a state in which the disc brake device 1 generates the braking force. The coupled vibration system of the disc brake device 1, the suspension 60 and the like might be formed when the slide pin 80 is forcibly wrenched in the fitting hole 63 when the friction pads 3 and 4 and the disc rotor 2 are brought into contact with each other to generate the braking force.

It is possible to reduce the moan noise by making the clearance around the slide pin 80 larger to inhibit a wrench of the slide pin 80 in the fitting hole 63, for example. However, this conflicts with sure restriction of the slide pin 80 in the fitting hole 63 as measures against the rattle noise as described above, so that it is possible that this cannot be satisfied together with the reduction in rattle noise.

That is to say, as illustrated in FIG. 5, by simply making the clearance around the slide pin 80 smaller, although rattle noise reduction performance can be improved, moan noise reduction performance tends to be deteriorated. On the other hand, by simply making the clearance around the slide pin 80 larger, although the moan noise reduction performance can be improved, the rattle noise reduction performance tends to be deteriorated. As a result, it is possible that the rattle noise reduction and the moan noise reduction are not satisfied at the same time.

Meanwhile, as for the moan noise, for example, the measures by displacing a resonance point by providing a mass damper and the like merely change a frequency of the moan noise, and they do not essentially solve the problem.

However, in the caliper 5 of the disc brake device 1 of this embodiment, the slide mechanism 8, which slidably connects the mounting 6 and the first cylinder member 70, and the swing mechanism 72, which swingably connects the first cylinder member 70 and the second cylinder member 71, are separately formed. That is to say, in the caliper 5, the slide mechanism 8 and the swing mechanism 72 are provided in different positions so as to be separately arranged. According to this, the caliper 5 can minimize the clearance around the slide pin 80 to a manufacturing limit, for example, while inhibiting the wrench of the slide pin 80 in the fitting hole 63 by allowing the first cylinder member 70 and the second cylinder member 71 to swing by the swing mechanism 72 during braking.

That is to say, in the cylinder 7, when the friction pads 3 and 4 and the friction surfaces of the disc rotor 2 are brought into contact with each other during braking of the vehicle, the second cylinder member 71 swings around the swing axis X2 set in the above-described positional relationship as the center of rotation/swing. At that time, the second cylinder member 71 swings together with the friction pads 3 and 4 relative to the first cylinder member 70 around the swing axis X2 as the center of rotation/swing. According to this, the caliper 5 can preferably discharge rotation behavior of the friction pads 3 and 4 and the second cylinder member 71 generated during braking of the vehicle by the swing mechanism 72, so that this can inhibit the wrench of the slide pin 80 in the fitting hole 63. Therefore, the disc brake device 1 can inhibit formation of the above-described coupled vibration system of the disc brake device 1, the suspension 60 and the like, so that this can reduce the moan noise without deterioration in the rattle noise reduction performance. In other words, the disc brake device 1 can inhibit the moan noise performance from deteriorating even when this makes the clearance around the slide pin 80 smaller to reduce the rattle noise.

Herein, FIG. 6 schematically illustrates operation of a disc brake device according to a comparative example. In this case, a cylinder 7A is not divided in the disc brake device according to the comparative example. In the disc brake device of this comparative example, the cylinder 7A is supported by the slide pin 80 so as to be slidingly movable. The disc brake device of the comparative example has a configuration in which the swing mechanism is provided on a connection between the slide pin 80 and the cylinder 7A. In this case, in the disc brake device according to the comparative example, swing of the cylinder 7A and the like is allowed by the swing mechanism on the connection between the slide pin 80 and the cylinder 7A. However, in the disc brake device according to the comparative example, the clearance between the fitting hole 63 and the slide pin 80 becomes smaller when the cylinder 7A swings from an initial position (refer to left column and middle column in FIG. 6) to be inclined relative to the slide pin 80 (refer to right column in FIG. 6), and a slight wrench might be generated.

On the other hand, as illustrated in FIG. 7, in the disc brake device 1 of this embodiment, since the first cylinder member 70 and the second cylinder member 71 are separately formed and the slide mechanism 8 and the swing mechanism 72 are separately provided, it is possible to secure a relatively large allowable swing angle of the second cylinder member 71 by the swing mechanism 72. As a result, the disc brake device 1 can surely discharge the rotation behavior of the friction pads 3 and 4 and the second cylinder member 71 even when the second cylinder member 71 swings from an initial position (refer to left column and middle column in FIG. 7) to be inclined relative to the first cylinder member 70 (refer to right column in FIG. 7), so that this can inhibit the clearance between the fitting hole 63 and the slide pin 80 from becoming smaller. Therefore, the disc brake device 1 can more surely inhibit the wrench, thereby significantly improving the moan noise reduction performance. Meanwhile, in this case, the swing mechanism 72 is preferably provided with a swing regulating unit and the like such that [allowable swing angle of second cylinder member 71] becomes not smaller than [maximum braking force of disc brake device 1 (N)/torsional stiffness of mounting 6 (N/deg)].

Therefore, the disc brake device 1 can solve conflicting problems as described above to satisfy both of the reduction in moan noise and the reduction in rattle noise, thereby appropriately reducing the abnormal noise.

For example, the disc brake device 1 can also reduce the rattle noise and the moan noise by interposing an absorbing member between the slide pin 80 and the fitting hole 63 of the slide mechanism 8. However, in this case, sliding resistance increases when the slide pin 80 slidingly moves, as a result, the friction pads 3 and 4 are dragged, and so-called brake vibration might be generated.

However, the disc brake device 1 satisfies both of the reduction in rattle noise and reduction in moan noise by connecting the mounting 6 and the first cylinder member 70 by means of the slide mechanism 8 and connecting the first cylinder member 70 and the second cylinder member 71 by means of the swing mechanism 72. According to this, the disc brake device 1 can satisfy both of the reduction in rattle noise and the reduction in moan noise while inhibiting the drag and the brake vibration when the slide pin 80 slidingly moves as described above.

The disc brake device 1 allows the swing of the second cylinder member 71 relative to the first cylinder member 70 by the swing mechanism 72, so that this can appropriately apply the braking force to the wheel without securing a high degree of attaching accuracy of the cylinder 7, a high degree of flatness accuracy of the friction pads 3 and 4 and the like, and can reduce a manufacturing cost, for example.

The disc brake device 1 of this embodiment improves braking stability when the braking is started, thereby inhibiting the abnormal noise such as a brake squeal from generating by further including a return mechanism 9 as illustrated in FIGS. 1, 8, and 9.

Specifically, the return mechanism 9 is provided on the swing mechanism 72 to apply force to the second cylinder member 71 to restore the same to the initial position in a swing direction (hereinafter, sometimes referred to as "restoring force").

The initial position of the second cylinder member 71 in the swing direction is an appropriate standby position set such that the friction pads 3 and 4 are located in predetermined standby positions in the non-braking state in which the friction pads 3 and 4 separate from the friction surfaces of the disc rotor 2 (in other words, at an unloaded time). Typically, the initial position is the position in which the friction materials 31 and 41 of the friction pads 3 and 4 are substantially parallel to the friction surfaces of the disc rotor 2 in the non-braking state of the disc brake device 1. Herein, the initial position is set in a position in which a central position L1 of the first cylinder member 70 in the swing direction and a central position L2 of the second cylinder member 71 in the swing direction substantially conform to each other in the non-braking state of the disc brake device 1 as illustrated in FIG. 8.

Meanwhile, the central position L1 of the first cylinder member 70 is the central position in the swing direction and corresponds to a position of a straight line passing through the swing axis X2 and a barycentric position of the first cylinder member 70, for example. Similarly, the central position L2 of the second cylinder member 71 is the central position in the swing direction and corresponds to a position of a straight line passing through the swing axis X2 and a barycentric position of the second cylinder member 71, for example.

The return mechanism 9 of this embodiment includes a plate spring 91 as an elastic member to generate the restoring force. The plate spring 91 is a member to return the second cylinder member 71 to the initial position at the unloaded time (non-braking time). The plate spring 91 is interposed between the second cylinder member 71 and the swing shaft 78. A plurality of (herein, eight) plate springs 91 are provided in a direction around the swing axis X2 at regular intervals. The plurality of plate springs 91 are radially provided around the swing axis X2. Herein, in the second cylinder member 71, a spring groove 92 is formed on an inner peripheral surface of the shaft hole 71d. A spring groove 93 is formed on an outer peripheral surface of the swing shaft 78. A plurality of (herein, eight) spring grooves 92 and spring grooves 93 are provided so as to be opposed to each other in the direction around the swing axis X2 at regular intervals. The plurality of spring grooves 92 and spring grooves 93 are radially provided around the swing axis X2.

In the return mechanism 9, each of a plurality of plate springs 91 are provided so as to be fitted into each spring groove 92 and each spring groove 93. According to this, the return mechanism 9 can elastically support the second cylinder member 71 on the swing shaft 78 in the initial position by a plurality of plate springs 91. Herein, the return mechanism 9 can connect the second cylinder member 71 and the swing shaft 78 such that they can rotate relative to each other around the swing axis X2 by a plurality of plate springs 91. Therefore, the return mechanism 9 can locate the first cylinder member 70 in an initial position in the non-braking state.

Meanwhile, although it is described that the second cylinder member 71, the swing shaft 78, and the plate spring 91 are separately formed in the return mechanism 9, the return mechanism 9 is not limited thereto. For example, it is possible to configure the return mechanism 9 by integrally forming the swing shaft 78 and the plate spring 91 and inserting each plate spring 91 into each spring groove 92, thereby inserting the swing shaft 78 into the shaft hole 71d.

In the return mechanism 9 configured in the above-described manner, when the disc brake device 1 is put into the braking state and the second cylinder member 71 swings together with the friction pads 3 and 4 around the swing axis X2 as the center of rotation/swing, each plate spring 91 is deformed to be bent in association with this as illustrated in FIGS. 10 and 11. According to this, the return mechanism 9 can allow the restoring force to act on the second cylinder member 71 by energizing force having magnitude according to an amount of deformation (bending amount) of each plate spring 91. The restoring force becomes force in a direction opposite to the swing direction of the second cylinder member 71 around the swing axis X2 and the force in a direction to restore the second cylinder member 71 to the initial position. Therefore, the return mechanism 9 can apply the restoring force to the second cylinder member 71 to restore the same to the initial position in the swing direction by the energizing force of each plate spring 91.

When the disc brake device 1 is put from the braking state into the non-braking state in a state in which the restoring force is allowed to act on the second cylinder member 71, the return mechanism 9 can restore the second cylinder member 71 to the initial position by the restoring force. The return mechanism 9 can also locate the second cylinder member 71 in the initial position by the restoring force in the non-braking state of the disc brake device 1, thereby stabilizing an attitude and behavior of the second cylinder member 71.

As a result, the disc brake device 1 can appropriately locate the second cylinder member 71 in the initial position at the non-braking time by the return mechanism 9. According to this, the disc brake device 1 can surely hold the second cylinder member 71 in an appropriate position in the non-braking state and surely inhibit the drag and the like of the friction pads 3 and 4. The disc brake device 1 can inhibit a misaligned state of the friction materials 31 and 41 of the friction pads 3 and 4 with respect to the friction surfaces of the disc rotor 2, for example, when the braking is started and can appropriately press them against each other with a plane. Therefore, the disc brake device 1 can improve the braking stability when the braking is started and inhibit the abnormal noise such as the brake squeal and the brake vibration from generating.

The disc brake device 1 according to the above-described embodiment is provided with the disc rotor 2, the friction pads 3 and 4, the mounting 6, the first cylinder member 70, and the second cylinder member 71. The disc rotor 2 rotates around the rotation axis X1. The friction pads 3 and 4 are opposed to the friction surfaces of the disc rotor 2. The mounting 6 is provided on the suspension 60 on the vehicle body side. The first cylinder member 70 is supported so as to be slidable relative to the mounting 6 by means of the slide mechanism 8. The second cylinder member 71 holds the friction pads 3 and 4. The second cylinder member 71 is supported so as to be swingable relative to the first cylinder member 70 around the swing axis X2 in the radial direction of the disc rotor 2 as the center of swing by means of the swing mechanism 72. The mounting 6, the first cylinder member 70, and the second cylinder member 71 compose the caliper 5.

Therefore, since the first cylinder member 70 and the second cylinder member 71 are separately formed and the second cylinder member 71 is swingable relative to the first cylinder member 70 by the swing mechanism 72, the disc brake device 1 and the caliper 5 can satisfy both of the reduction in rattle noise and the reduction in moan noise, thereby appropriately reducing the abnormal noise. As a result, the disc brake device 1 and the caliper 5 can appropriately reduce so-called NV (noise-vibration).

Further, the disc brake device 1 according to the above-described embodiment is provided with the return mechanism 9 provided on the swing mechanism 72 for applying the force to the second cylinder member 71 to restore the same to the initial position in the swing direction.

Therefore, the disc brake device 1 and the caliper 5 can locate the second cylinder member 71 in the appropriate initial position by the return mechanism 9 at the non-braking time and improve the braking stability when the braking is started, thereby reducing the abnormal noise.

Meanwhile, the disc brake device and the caliper according to the embodiment of the present invention described above are not limited to the above-described embodiment and can be variously modified within the scope of claims.

Although the above-described return mechanism 9 is described to include the plate spring 91, the return mechanism 9 is not limited thereto. For example, as illustrated in FIG. 12, a return mechanism 209 according to a modified example may include an elastic body 291 having a shape of an annular (hollow cylindrical) column in place of the plate spring 91 as an elastic member. The elastic body 291 is formed of an annular spring, a cylindrical rubber member, for example.

In this case, a plurality of (herein, four) elastic bodies 291 are provided in the direction around the swing axis X2 at regular intervals. Herein, in the second cylinder member 71, an accommodating groove 292 is formed on the inner peripheral surface of the shaft hole 71d. An accommodating groove 293 is formed on the outer peripheral surface of the swing shaft 78. A plurality of (herein, four) accommodating grooves 292 and accommodating grooves 293 are provided so as to be opposed to each other in the direction around the swing axis X2 at regular intervals. The return mechanism 209 is provided such that each of the plurality of elastic bodies 291 is fitted into each accommodating groove 292 and each accommodating groove 293.

According to this, the return mechanism 209 can elastically support the second cylinder member 71 in the initial position on the swing shaft 78 by a plurality of elastic bodies 291. Therefore, the return mechanism 209 can locate the first cylinder member 70 in the initial position in the non-braking state. That is to say, in the return mechanism 209, when the disc brake device 1 is put into the braking state and the second cylinder member 71 swings, each elastic body 291 is crushed between each accommodating groove 292 and each accommodating groove 293 in association with this to be elastically deformed. According to this, the return mechanism 209 can allow the restoring force to act on the second cylinder member 71 by the energizing force having the magnitude according to the amount of deformation of each elastic body 291. Therefore, the return mechanism 209 can apply the restoring force to the second cylinder member 71 to restore the same to the initial position in the swing direction by the energizing force of each elastic body 291. In this case also, the disc brake device 1 and the caliper 5 can locate the second cylinder member 71 in the appropriate initial position by the return mechanism 209 at the non-braking time and improve the braking stability when the braking is started, thereby reducing the abnormal noise.

Also, for example, as illustrated in FIG. 13, a return mechanism 309 according to a modified example may include a flat spring 391 in place of the plate spring 91 and the elastic body 291 as the elastic member. The spring 391 is provided so as to connect the inner peripheral surface of the shaft hole 71*d* of the second cylinder member 71 and the outer peripheral surface of the swing shaft 78. According to this, the return mechanism 309 can elastically support the second cylinder member 71 in the initial position on the swing shaft 78. Herein, the return mechanism 309 can connect the second cylinder member 71 and the swing shaft 78 such that they can relatively rotate around the swing axis X2 by the spring 391. Therefore, the return mechanism 309 can locate the first cylinder member 70 in the initial position in the non-braking state. In this case, it is possible that the second cylinder member 71 and the swing shaft 78 do not include the spring grooves 92 and 93, the accommodating grooves 292 and 293 and the like. In this case also, the disc brake device 1 and the caliper 5 can locate the second cylinder member 71 in the appropriate initial position by the return mechanism 309 at the non-braking time and improve the braking stability when the braking is started, thereby reducing the abnormal noise.

Although it is described that the slide pin provided on the second member (first cylinder member 70) is inserted into the concave portion provided on the first member (mounting 6) in the above-described slide mechanism, the slide mechanism is not limited thereto. The slide mechanism may be configured such that the slide pin provided on the first member (mounting 6) is inserted into the concave portion provided on the second member (first cylinder member 70). In this case, the slide pin is assembled with the first member (mounting 6).

Although it is described that the swing shaft is provided on the second member (first cylinder member 70) in the description above, the swing shaft is not limited thereto. The swing shaft may be provided on the third member (second cylinder member 71) and inserted into the shaft hole formed on the second member, thereby supporting the third member on the second member such that they may relatively swing. In this case, the elastic member is interposed between the second member and the swing shaft.

REFERENCE SIGNS LIST

1 DISC BRAKE DEVICE
2 DISC ROTOR
3, 4 FRICTION PAD
5 CALIPER
6 MOUNTING (FIRST MEMBER)
7 CYLINDER
8 SLIDE MECHANISM
9, 209, 309 RETURN MECHANISM
31, 41 FRICTION MATERIAL
60 SUSPENSION (FIXED PART)
70 FIRST CYLINDER MEMBER (SECOND MEMBER)
71 SECOND CYLINDER MEMBER (THIRD MEMBER)
72 SWING MECHANISM
78 SWING SHAFT
91 PLATE SPRING (ELASTIC MEMBER)
291 ELASTIC BODY (ELASTIC MEMBER)
391 SPRING (ELASTIC MEMBER)
X1 ROTATION AXIS
X2 SWING AXIS

The invention claimed is:

1. A disc brake device, comprising:
a disc rotor configured to rotate around a rotation axis;
a friction pad opposed to a friction surface of the disc rotor;
a first member provided on a fixed part on a vehicle body side;
a second member;
a slide mechanism configured to support the second member slidably, relative to the first member, in a rotation axis direction of the disc rotor;
a third member configured to hold the friction pad and supported so as to be swingable, relative to the second member, about a swing axis by a swing mechanism, the swing axis extending in a radial direction of the disc rotor; and
a return mechanism provided on the swing mechanism to apply force to the third member to restore the third member to an initial position in a swing direction, wherein
the return mechanism includes an elastic member configured to generate the force to restore,
the swing mechanism includes a swing shaft provided on one of the second member and the third member, and
the elastic member is interposed between the other of the second member and the third member and the swing shaft.

2. The disc brake device according to claim 1, wherein the return mechanism locates the third member in the initial position in a state in which the friction pad and the friction surface of the disc rotor separate from each other.

3. The disc brake device according to claim 1, wherein the initial position is a position in which a friction material of the friction pad and the friction surface are parallel to each other in a state in which the friction pad and the friction surface of the disc rotor separate from each other.

4. The disc brake device according to claim 1, wherein the initial position is a position in which a central position of the second member in a swing direction and a central position of the third member in the swing direction conform to each other.

5. A caliper that holds a friction pad opposed to a friction surface of a disc rotor rotating around a rotation axis, the caliper comprising:
a first member provided on a fixed part on a vehicle body side;

a second member;

a slide mechanism configured to support the second member slidably, relative to the first member, in a rotation axis direction of the disc rotor;

a third member configured to hold the friction pad and supported so as to be swingable, relative to the second member, about a swing axis by a swing mechanism, the swing axis extending in a radial direction of the disc rotor; and a return mechanism provided on the swing mechanism to apply force to the third member to restore the third member to an initial position in a swing direction, wherein the return mechanism includes an elastic member configured to generate the force to restore, the swing mechanism includes a swing shaft provided on one of the second member and the third member, and the elastic member is interposed between the other of the second member and the third member and the swing shaft.

6. The disc brake device according to claim 2, wherein the initial position is a position in which a friction material of the friction pad and the friction surface are parallel to each other in a state in which the friction pad and the friction surface of the disc rotor separate from each other.

7. The disc brake device according to claim 2, wherein the initial position is a position in which a central position of the second member in a swing direction and a central position of the third member in the swing direction conform to each other.

8. The disc brake device according to claim 3, wherein the initial position is a position in which a central position of the second member in a swing direction and a central position of the third member in the swing direction conform to each other.

9. A disc brake device, comprising:

a disc rotor configured to rotate around a rotation axis;

a friction pad opposed to a friction surface of the disc rotor;

a mounting provided on a fixed part on a vehicle body side;

a first cylinder member;

a slide mechanism configured to support the first cylinder member slidably, relative to the mounting, in a rotation axis direction of the disc rotor;

a second cylinder member configured to hold the friction pad and supported so as to be swingable, relative to the first cylinder member, about a swing axis by a swing mechanism, the swing axis extending in a radial direction of the disc rotor; and a return mechanism provided on the swing mechanism to apply force to the second cylinder member to restore the second cylinder member to an initial position in a swing direction, wherein the return mechanism includes an elastic member configured to generate the force to restore, the swing mechanism includes a swing shaft provided on one of the first cylinder member and the second cylinder member, and the elastic member is interposed between the other of the first cylinder member and the second cylinder member and the swing shaft.

* * * * *